Nov. 12, 1940.   H. T. KRAFT   2,221,642

TIRE TREAD AND METHOD OF MAKING THE SAME

Filed July 20, 1936

INVENTOR
Herman T. Kraft
BY Evans & McCoy
ATTORNEYS

Patented Nov. 12, 1940

2,221,642

UNITED STATES PATENT OFFICE 2,221,642

TIRE TREAD AND METHOD OF MAKING THE SAME

Herman T. Kraft, Akron, Ohio, assignor to The General Tire & Rubber Company, Akron, Ohio, a corporation of Ohio Application July 20, 1936, Serial No. 91,552

14 Claims. (Cl. 154—14)

This invention relates to anti-skid tire treads of the type disclosed in my copending application, Serial No. 754,104, filed November 21, 1934, now Patent No. 2,048,635, issued July 21, 1936, and to a method of making the same.

In my copending application there is disclosed an anti-skid tire tread composed of closely spaced, narrow, flexible, circumferential ribs, which are capable of flexing laterally under frictional thrust, and which are very effective in resisting slip of the tire tread on a road surface.

In the molding of pneumatic tires the grooves in the tire tread are formed by ribs on the interior of the mold, and such ribs must have sufficient strength to withstand the stresses to which they are subjected in removing a vulcanized tire from the mold. It has been found difficult to mold these tires with grooves as narrow as is desirable for certain tires.

It has been found also that ribs arranged in groups that are spaced a greater distance than the spacing between adjacent ribs provide a tire in which the groups of ribs mutually support each other because of the narrow spacing therebetween to thereby increase the lateral stability of the tire without detracting from its non-skid and long wear characteristics. It is desirable, however, that there be an actual space between the individual ribs, as distinguished from a slitting of the surface that does not remove rubber from between the ribs, in order to obtain the maximum benefits from the construction.

The present invention has for an object to provide a method by which the aggregate width of the circumferential grooves in a tire tread may be made less than can conveniently be done by molding. By making a tire tread with some of its grooves molded and other of its grooves cut and very narrow, the molded grooves may be made wider than in a tire having the same aggregate road engaging surface, in which all grooves are molded. A tire tread having the wider molded grooves and the very narrow cut grooves has less tendency to pick up pebbles and retain them between the ribs than a tread having the same aggregate groove width in which the width of groove is uniform.

A further object of the invention is to facilitate the cutting of narrow grooves in a tire tread.

A further object of the invention is to provide a circumferential grooved tire tread in which certain of the grooves are molded and other of the grooves are cut and narrower than the molded grooves.

With the above and other objects in view, the invention may be said to comprise the tire tread and method of making the same as hereinafter described and illustrated in the accompanying drawing, together with such variations and modifications thereof as will be apparent to one skilled in the art to which the invention appertains.

Reference should be had to the accompanying drawing forming a part of this specification, in which.

Figure 1:
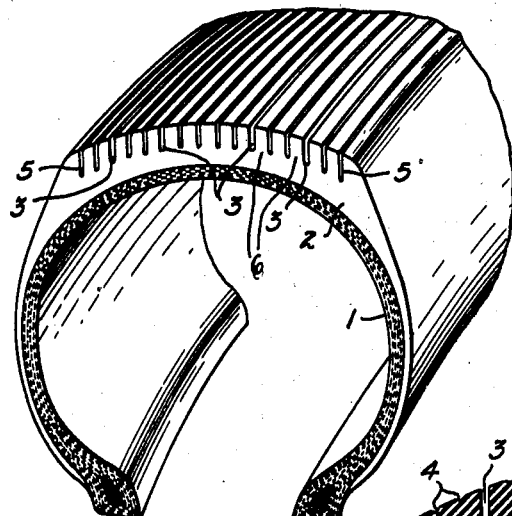
Figure 1 is a sectional view showing a completed tire embodying the invention.
Figure 2:
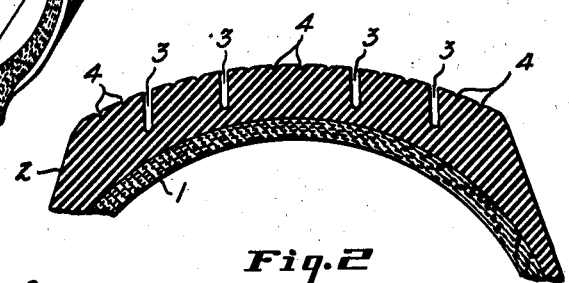
Fig. 2 is a fragmentary section of the tire tread shown in Fig. 1 as molded, and prior to the groove cutting operation.

As shown in Figs. 1 and 2, the pneumatic tire 1 has a thickened tread 2 provided with laterally spaced molded grooves 3 which are narrow and deep, and which extend circumferentially around the tread. Intermediate the molded grooves 3, and outwardly thereof, shallow V-shaped guide grooves 4 are molded in the tread parallel with the grooves 3. The shallow grooves 4 serve as guides for a suitable heated cutting tool by which the circumferential grooves 5, shown in Fig. 1, are cut. The cut grooves 5 are narrower than the molded grooves 3, and parallel with the grooves 3, and of substantially the same depth. By molding part of the grooves and cutting the remainder, the aggregate width of the grooves may be made less than when all of the grooves are molded and a tread is formed which is composed of narrow, flexible ribs 6. By reducing the aggregate width of the grooves, the road engaging surface of the tread is increased and the ribs are capable of sustaining a greater load without distortion.

Figure 3:
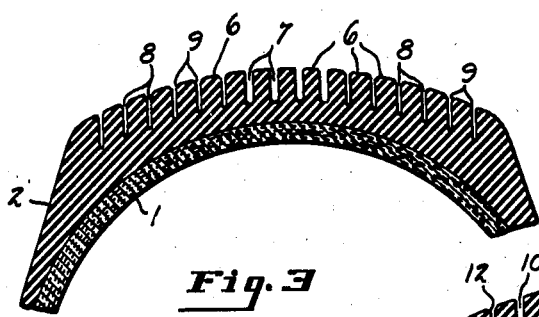
Figs. 3, 4 and 5 are sectional views showing a modified tire tread construction.

In Fig. 3 a tire tread is shown having molded grooves 7 in the central portion thereof and cut grooves 8 between the sides of the tread and the molded grooves, each of the cut grooves extending inwardly from the bottom of the guide groove 9. In this modification the ribs in the central portion of the tread have greater lateral flexing movement by reason of the wider grooves.

Figure 4:
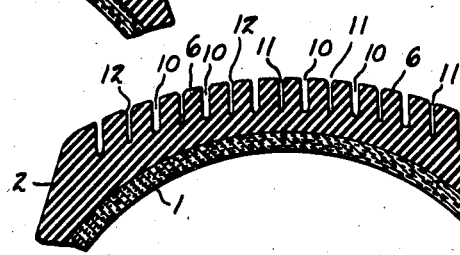

In Fig. 4 of the drawing alternate grooves 10 are molded and intermediate grooves 11 are cut, each of the cut grooves extending inwardly from the bottom of a V-shaped guide groove 12. In this modification each of the molded ribs is of double width and is divided into two ribs by a circumferential cut groove.

Figure 5:
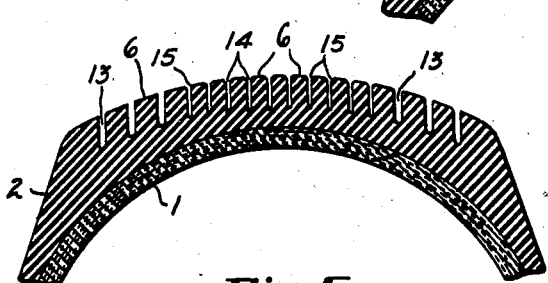

In Fig. 5 of the drawing, molded grooves 13 are formed in opposite side portions of the tread, and narrower grooves 14 are cut in the central portion of the tread, the circumferential cut grooves each extending inwardly from the bottom of a V-shaped guide groove 15.

It is apparent that the method of the present invention provides a means by which the desired rigidity may be imparted to the road engaging portion of the tread, and by which the desired flexibility may be imparted to portions of the road engaging surface.

Other modes of applying and utilizing the principles of the invention are contemplated, change being made with regard to the details of construction and procedure set forth as desired, numerous modifications being contemplated, and included within the scope of the invention.

What I claim is:

1. The herein described method of forming an anti-skid tread which comprises molding the tread with relatively wide circumferential ribs separated by narrow relatively deep grooves and dividing said relatively wide ribs into a plurality of narrow flexible ribs by cutting deep circumferential grooves therein parallel to the molded grooves.

2. The herein described method of forming an anti-skid tread which comprises molding the tread with relatively wide circumferential ribs separated by narrow relatively deep grooves and with shallow guide grooves in the ribs parallel with the deep grooves, and cutting deep circumferential grooves narrower than the molded grooves along the bottoms of said guide grooves.

3. A tire tread comprising spaced pairs of individually deep and narrow circumferential, flexible ribs, the ribs of each pair being spaced from one another a distance less than the spacing of said pairs of ribs, the spacing between the individual ribs of each pair being sufficiently small to permit said individual ribs to mutually support each other under side thrusts, and the grooves separating the groups of ribs being substantially the same depth as the grooves defining the ribs of each group.

4. An anti-skid tire tread of rubber or the like which comprises a plurality of relatively narrow, substantially parallel, elongated ribs extending circumferentially around the tire and separated from one another by substantially parallel grooves of different widths, all of said grooves being of substantially the same depth.

5. An anti-skid tire tread of rubber or the like which comprises a plurality of relatively narrow, substantially parallel, elongated ribs extending circumferentially around the tire and separated from one another by substantially parallel grooves of different widths, all of said grooves being of substantially the same depth, and the narrow grooves being alternately arranged with respect to the wide grooves laterally across the tread.

6. An anti-skid tire tread of rubber or the like which comprises a plurality of relatively narrow, substantially parallel, elongated ribs extending circumferentially around the tire and of greater height than depth separated from one another by substantially parallel grooves of different widths, all of said grooves being of substantially the same depth, and there being a plurality of narrow grooves between adjacent wide grooves.

7. An anti-skid tire tread of rubber or the like which comprises a plurality of relatively narrow, substantially parallel, elongated ribs extending circumferentially around the tire and separated from one another by substantially parallel grooves of substantially the same depth, some of said grooves being relatively wide and others of said grooves being relatively narrow and disposed intermediate the wide grooves, and said narrow grooves being arranged so that upon lateral deflection the ribs mutually support one another.

8. An anti-skid tire tread of rubber or the like having integrally formed thereon a plurality of narrow and elongated, substantially parallel, flexible ribs extending circumferentially around the tire and separated from one another by substantially parallel grooves of different widths, the sides of the ribs defined by the narrower grooves presenting cut surfaces and the sides of the ribs defined by the wider grooves presenting molded surfaces, and the depth of the narrow grooves being substantially equal to the depth of the wide grooves.

9. An anti-skid tire tread of rubber or the like which comprises a plurality of groups of substantially parallel ribs, said ribs extending circumferentially around the entire periphery of the tire tread and being individually of greater height than width and laterally unstable to permit flexing thereof under side thrusts, relatively wide grooves separating the groups of ribs, and relatively narrow grooves separating the individual ribs of each group, said wide and narrow grooves being of substantially the same depth and the ribs arranged to mutually support one another upon lateral flexing thereof.

10. The method of forming an anti-skid tread of rubber or the like which comprises vulcanizing the tread, molding a plurality of spaced, relatively deep narrow and substantially parallel grooves, and a plurality of relatively shallow guide grooves substantially parallel to the deep grooves, into the tread during said vulcanization, and cutting in the vulcanized tread a plurality of deep grooves narrower than the molded grooves along the bottoms of the guide grooves to form a plurality of relatively narrow and flexible ribs.

11. The method of forming an anti-skid tread of rubber or the like which comprises vulcanizing the tread, molding a plurality of spaced, relatively wide, substantially parallel ribs, separated by narrow, relatively deep grooves on the tread and a plurality of relatively shallow guide grooves in the ribs substantially paralleling the deep grooves, during said vulcanization, and cutting in the vulcanized tread, along the bottoms of the molded guide grooves, a plurality of deep grooves to form a plurality of relatively narrow flexible ribs.

12. The method of forming an anti-skid tread of rubber or the like which comprises vulcanizing the tread, molding a plurality of shallow guide grooves in the tread during said vulcanization, and cutting in the vulcanized tread a plurality of relatively deep narrow grooves along the bottoms of said guide grooves.

13. The method of forming an anti-skid tire tread of rubber or the like which comprises vulcanizing the tread while molding the same with a plurality of spaced, substantially parallel, circumferentially extending grooves and with a number of substantially parallel, relatively wide ribs separated by the grooves, and then dividing the ribs into a plurality of relatively narrow flexible ribs by cutting in the vulcanized ribs spaced, substantially parallel, circumferentially extending grooves narrower than the molded grooves and substantially parallel thereto.

14. The method of forming an anti-skid tire tread of rubber or the like which comprises vulcanizing the tread while molding the same with a plurality of spaced, substantially parallel, circumferentially extending grooves of greater depth than width and with a number of substantially parallel ribs of greater width than height separated by the grooves, and then dividing the ribs into a plurality of relatively narrow flexible ribs of greater height than width by cutting in the vulcanized ribs spaced, substantially parallel, circumferentially extending grooves narrower than the molded grooves and substantially parallel thereto.

HERMAN T. KRAFT.